(12) United States Patent
Atamanov et al.

(10) Patent No.: US 11,377,220 B1
(45) Date of Patent: Jul. 5, 2022

(54) METHODS OF INCREASING FLIGHT SAFETY, CONTROLLABILITY AND MANEUVERABILITY OF AIRCRAFT AND AIRCRAFT FOR IMPLEMENTATION THEREOF

(71) Applicant: HOVERSURF, INC., Wilmington, DE (US)

(72) Inventors: Aleksandr V. Atamanov, Saint Petersburg (RU); Aleksandr Skalov, Krasnodar (RU)

(73) Assignee: Hoversurf, Inc., Wilmington, DE (US)

( * ) Notice: Subject to any disclaimer, the term of this patent is extended or adjusted under 35 U.S.C. 154(b) by 0 days.

(21) Appl. No.: 17/519,428

(22) Filed: Nov. 4, 2021

(30) Foreign Application Priority Data

Sep. 27, 2021 (RU) ............................ RU2021128362

(51) Int. Cl.
*B64D 27/24* (2006.01)
*B64C 29/00* (2006.01)

(52) U.S. Cl.
CPC .............. *B64D 27/24* (2013.01); *B64C 29/00* (2013.01)

(58) Field of Classification Search
CPC ......... B64D 27/24; B64C 29/00; B64C 39/02; B64C 39/026
See application file for complete search history.

(56) References Cited

U.S. PATENT DOCUMENTS

| 2,989,269 A | 6/1961 | Le Bel |
| 4,828,203 A | 5/1989 | Clifton |
| 6,732,972 B2 | 5/2004 | Malvestuto, Jr. |
| 8,181,903 B2 | 5/2012 | Posva |
| D665,333 S | 8/2012 | Oliver |

(Continued)

FOREIGN PATENT DOCUMENTS

| CA | 2801651 C | 1/2012 |
| CN | 106585976 A | 4/2017 |

(Continued)

OTHER PUBLICATIONS

U.S. Appl. No. 17/488,134; Office Action dated Jan. 4, 2022; (11 pgs.).

*Primary Examiner* — Rodney A Bonnette
(74) *Attorney, Agent, or Firm* — Fitch, Even, Tabin & Flannery LLP (57) ABSTRACT

Vertical take-off/landing and horizontal straight flight aircraft for transportation of passengers, cargo, and/or goods are described herein. The aircraft have increased thrust and flight speed; improved controllability and maneuverability of flight; increased safety of take-off, landing and touch-down of the aircraft; reduction in the weight and size characteristics of aircraft. An aircraft includes redistributed, assembled and interconnected small-sized independently operating electric motors of the main rotors obtained by defragmentation of the propeller-motor group (PMG), spaced from each other and forming a small-sized independently operating PMG located at certain distance from the longitudinal axis of the aircraft, and each small-sized main rotor in each small-sized independently operating PMG is connected to the small-sized independently operating electric motor. The small-sized independently operating PMGs are installed inside the screens, on the beams of the common frame and/or on tubes.

14 Claims, 5 Drawing Sheets

(56) References Cited

U.S. PATENT DOCUMENTS

| | | |
|---|---|---|
| 11,072,421 B2 | 7/2021 | Shi |
| 2003/0062443 A1 | 4/2003 | Wagner |
| 2004/0245374 A1 | 12/2004 | Morgan |
| 2006/0016929 A1 | 1/2006 | Mohr |
| 2006/0192046 A1 | 8/2006 | Heath |
| 2006/0231677 A1 | 10/2006 | Zimet |
| 2009/0159740 A1 | 6/2009 | Brody |
| 2012/0043413 A1 | 2/2012 | Smith |
| 2013/0020429 A1 | 1/2013 | Kroo |
| 2014/0061366 A1 | 3/2014 | Fink |
| 2014/0097290 A1 | 4/2014 | Leng |
| 2015/0012154 A1* | 1/2015 | Senkel .................. B64C 27/20 701/4 |
| 2015/0344134 A1 | 12/2015 | Cruz Ayoroa |
| 2016/0236774 A1 | 8/2016 | Niedzballa |
| 2018/0140933 A1* | 5/2018 | Chen .................. B64C 13/044 |
| 2018/0354617 A1 | 12/2018 | Frolov |
| 2019/0084684 A1 | 3/2019 | Eller |
| 2019/0106206 A1 | 4/2019 | Shi |
| 2019/0256200 A1* | 8/2019 | Neff .................. B64D 27/24 |
| 2020/0007825 A1* | 1/2020 | Jeong .................. B64F 1/362 |
| 2020/0140078 A1 | 5/2020 | Lu |
| 2020/0331590 A1* | 10/2020 | Yuksel .................. B64C 29/02 |
| 2021/0245872 A1 | 8/2021 | Poh |
| 2021/0300535 A1* | 9/2021 | Petrov .................. B64C 25/06 |

FOREIGN PATENT DOCUMENTS

| | | |
|---|---|---|
| CN | 109018335 A | 12/2018 |
| CN | 110697035 A | 1/2020 |
| DE | 102013108206 | 2/2015 |
| EP | 3670341 A1 | 6/2020 |
| EP | 3771637 A1 | 2/2021 |
| FR | 3092822 A1 | 8/2020 |
| GB | 2423509 A | 8/2006 |
| GB | 2468917 A | 9/2010 |
| GB | 2555439 A | 5/2018 |
| GB | 2569659 A | 6/2019 |
| JP | 2011255892 A | 12/2011 |
| RU | 127039 U1 | 4/2013 |
| RU | 163412 U1 | 7/2016 |
| RU | 2629478 C2 | 8/2017 |
| RU | 2657650 C1 | 6/2018 |
| WO | 0047470 A2 | 8/2000 |
| WO | 2005039972 A2 | 5/2005 |
| WO | 2005072233 A2 | 8/2005 |
| WO | 2009069109 A2 | 6/2009 |
| WO | 2009108178 A2 | 9/2009 |
| WO | 2011140551 A1 | 11/2011 |
| WO | 2016028358 A2 | 2/2016 |
| WO | 2016181044 A1 | 11/2016 |
| WO | 2017132515 A2 | 8/2017 |
| WO | 2018208652 A1 | 11/2018 |
| WO | 2018209911 A1 | 11/2018 |
| WO | 2019244892 A1 | 12/2019 |
| WO | 2020105045 A1 | 5/2020 |
| WO | 2020207862 A1 | 10/2020 |

* cited by examiner

PRIOR ART

Fig. 1

PRIOR ART

METHODS OF INCREASING FLIGHT SAFETY, CONTROLLABILITY AND MANEUVERABILITY OF AIRCRAFT AND AIRCRAFT FOR IMPLEMENTATION THEREOF

CROSS-REFERENCE TO RELATED APPLICATIONS

This Application Claims priority to Russian patent application no. 2021128362, filed Sep. 27, 2021.

TECHNICAL FIELD

The claimed group of inventions relates to aviation technology, namely to small-sized aircraft of vertical take-off/landing and horizontal straight flight, designed, in particular, for the transportation of passengers, as well as the transportation and delivery of various cargo and goods.

BACKGROUND

From the technical level, a known aircraft includes a load-bearing power platform, on the end sections of which engines with load-bearing propellers are installed (see Russian Federation patent no. 2657650).

The disadvantages of the known aircraft are: low controllability, maneuverability of the aircraft; low safety due to the presence of traumatic propellers of large diameter and the lack of their protection from collisions with the ground and other obstacles; failure of at least one propeller or engine out of four leads to accidents, which lead to low flight safety; large weight and size characteristics of the aircraft due to the presence of the large propeller-motor group (PMG); low speed and comfort of flight; the inability to ensure the proper level of thrust when using open blades of propellers; high noise of the aircraft due to the lack of shielding of the propellers; limited functionality: inability to transport and deliver cargo, not intended for passenger transportation.

From the technical level, aircraft are known that include a load-bearing frame with electric motors and propellers installed in pairs in the corners, while electric motors with propellers are installed in protective enclosures (see Russian Federation patent nos. 127039, 163412).

The disadvantages of the known aircraft are: large weight and size characteristics of the aircraft due to the presence of the PMG and large-sized protective screens; low controllability, maneuverability and flight speed; low aircraft flight comfort for the pilot; limited functionality: inability to transport and deliver cargo, not intended for passenger transportation; and short range and duration of flight.

From the technical level, aircraft are known, including from two to several tens of electric propellers in the form of electric motors with propellers (rotors) (see, for example, published patent applications DE 102013108206 and US 2015012154).

The disadvantages of the known aircraft are: large weight and size characteristics of the aircraft due to the presence of the PMG and large-sized protective screens; low flight safety due to the presence of open rotating blades of large diameter propellers; the inability to ensure the proper level of thrust when using open main rotors; high noise of the aircraft due to the lack of shielding of the ends of the rotor blades.

An objective of the group of inventions described herein is to create a compact, safe aircraft during take-off/landing and flight with high maneuverability and controllability, as well as increased flight speed.

SUMMARY

The purpose of the claimed group of the invention is to create the compact, mobile, safe during take-off/landing and flight aircraft for the transportation of people and various cargo (goods), with high maneuverability, controllability and flight speed, as well as low noise.

The technical results of the claimed group of inventions are: increasing the thrust and flight speed; improved flight handling and maneuverability; increasing the safety of take-off, landing and touchdown of aircraft; reducing the weight and size characteristics of the aircraft; increased responsiveness of propeller-motor groups (PMG); increasing the fall-safety of the PMG; increasing the stability, resistance and comfort of the flight of the aircraft; the possibility of giving any geometric shape to the PMG, in contrast to the circle, which has the beneficial effect on the stability, rigidity, efficiency of the aircraft, there is the possibility of changing the weight distribution; increased maintainability (the ability to promptly identify and eliminate malfunctions (breakages) of small-sized PMGs visible from the outside); noise reduction; increasing the mobility and compactness of the aircraft.

The technical results of the claimed group of inventions are achieved by the fact that the aircraft for the implementation of the method includes the redistributed propeller-motor groups (PMG) obtained by defragmentation, assembled and interconnected small-sized independently operating electric motors of the main rotors, located at the certain distance from each other and forming small-sized independently operating PMG, located at the certain distance from each other and from the longitudinal axis of the aircraft, while each small-sized main rotor in each small-sized independently operating PMG are connected to the small-sized independently operating electric motor.

In one embodiment, small-sized independently operating PMGs are mounted on the beams of a common load-bearing power platform-frame having, for example, X, H or square-shaped shape.

In another embodiment, small-sized independently operating electric motors of the main rotors are mounted on tubes fixed by means of connecting to each other and/or on the beams of the common load-bearing power platform-frame, forming the PMG along the perimeter (area), for example in the form of circle, triangle, square, rectangle, polygon, trapezoid, parallelogram, rhombus, ellipse.

In embodiments, small-sized independently operating PMGs are installed inside the screens.

In one particular embodiment, for example, open spatial (tubular) frames are used as screens, for example, in the form of sphere, cylinder, cube, ellipsoid or parallelepiped, closed or open type, while small-sized independently operating PMGs are installed inside the screens in such a way that they are visible from all external sides and there is access to them.

In another particular embodiment, for example, housings or rings are used as screens, while small-sized independently operating PMGs are installed inside the screens in such a way that they are visible from certain external sides and there is access to them.

In one embodiment, small-sized independently operating PMGs are installed, for example, at the front and rear of the aircraft.

In another embodiment, small-sized independently operating PMGs are installed, for example, in front, behind and on the sides of the aircraft.

In embodiments, the number of small-sized independently operating PMGs can be any, but the same in front and behind the aircraft, and on the sides of the aircraft, while the number of front and rear PMGs may differ from the number of PMGs on the sides of the aircraft.

In embodiments, the number of small-sized independently operating electric motors with main rotors in each front and rear, and side small-sized independently operating PMG can be any, but the same in each front and rear PMG, and in each side PMG, while their number in the front and rear PMG may differ from the number in the side PMG.

In some embodiments, the aircraft is made unpiloted, or contains the cockpit for the pilot and/or passengers, or the pilot's seat.

BRIEF DESCRIPTION OF THE DRAWINGS

The claimed group of inventions are explained in the following detailed description, illustrated by drawings (see FIGS. 1-10), where the following is shown.

The reference numbers in FIGS. 1-10 indicate the following features of the exemplary embodiments:
1—front propellers—main rotors;
2—rear propellers—main rotors;
3—electric motors of main rotors;
4—beams of the load-bearing power platform-frame;
5—pilot's seat;
6—screens;
7—means of connection;
8—front PMGs;
9—rear PMGs;
10—small-sized (defragmented) main rotors;
11—tubes;
12—small-sized (defragmented) independently operating electric motors;
13—the open end of the tube or beam of the load-bearing power platform-frame;
14—tubes of the open spatial tubular frame-screen;
15—additional tubes.

DETAILED DESCRIPTION

In this application, the defragmentation of the propeller-motor group (PMG) will be understood as the breakdown of the usual propeller-motor group (PMG) of large sizes into smaller (small-sized) ones PMGs by reducing the diameters of the main rotors, the sizes of motors and Electronic Stroke Controllers (ESC) and the assembly of groups of smaller PMGs, for example, on beams (4) of the common load-bearing power platform-frame or on tubes (11,15).

Figure 1:
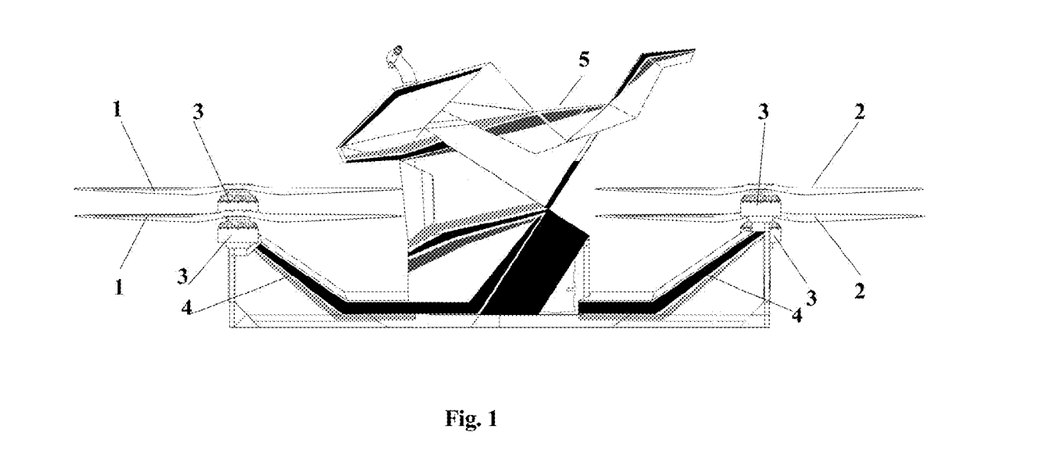
FIGS. 1 and 2 show the aircraft analog (side view and top view, respectively), containing the pilot's seat, open front and rear main rotors with motors of large dimensions mounted on the beams of the carrier power platform-frame (two in front and two behind the aircraft).
Figure 2:
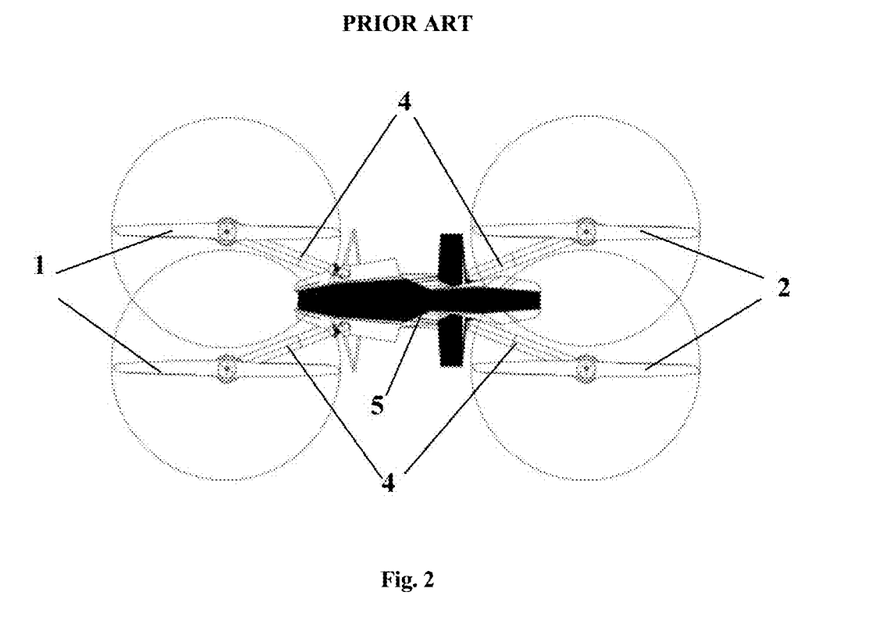
Figure 3:
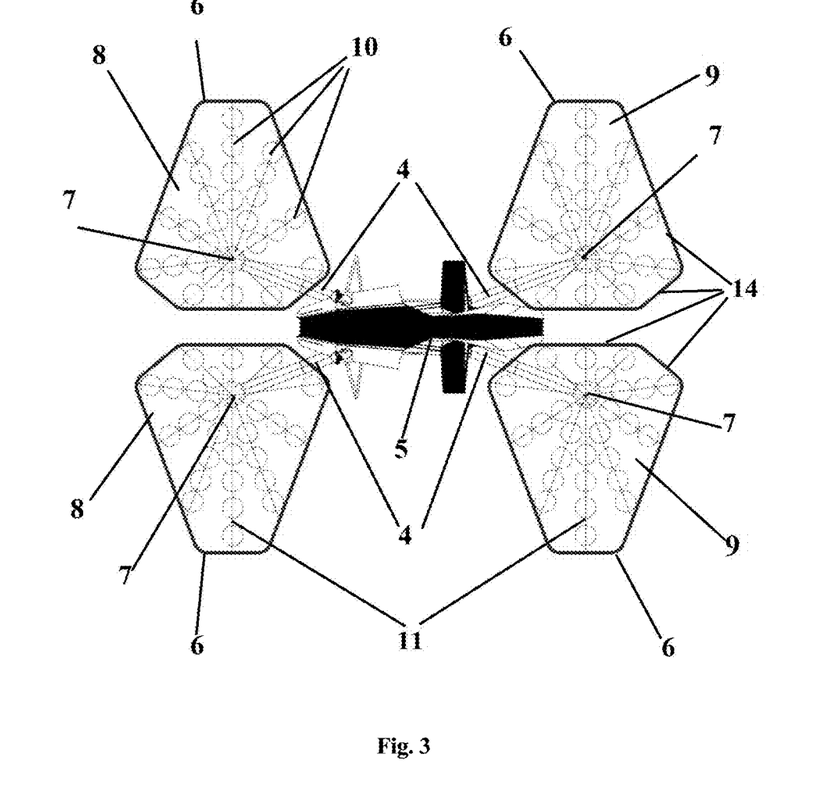
FIG. 3 shows an exemplary embodiment of the claimed aircraft (top view).

FIG. 3 shows a top view of one of the embodiments of the claimed aircraft in the form of the flying motorcycle. The aircraft contains defragmented (small-sized) two front (8) and two rear PMGs. Each front (8) and rear (9) PMG includes several defragmented (small-sized) independently operating electric motors of the main rotors (10) located at a certain distance from each other, and each main rotor of the front (8) and rear (9) PMG has its own individual independently operating electric motor. The front (8) and rear (9) PMGs are installed inside screens (6) that perform a protective function and have the shape of hexagon around the perimeter (in area). Screens (6) can also have any other shapes, for example, the shape of triangle, polygon, circle, trapezoid, parallelogram, rhombus or ellipse. Screens (6) can be made, for example, in the form of open load-bearing spatial (tubular) frames, housings or rings of various shapes and sizes.

The screens (6) of the front (8) and rear (9) PMGs are made in the form of open load-bearing spatial tubular frames (see FIG. 3). The PMGs (8,9) are installed inside the screens (6) in such a way that they are visible from all external sides and there is access to them. Small-sized independently operating electric motors of the main rotors (10) are fixed by their fixed base on tubes (11) that are fixed by means of the connection (7), for example, a nodal connector, at the end sections of the beams (4) of the common cross-shaped load-bearing power platform-frame, forming a petal shape. The defragmented PMGs (8,9) are assembled and interconnected inside the screens (6), forming the shape of a hexagon (see FIG. 3).

The PMGs (8,9) can have various shapes, for example, circle, triangle, rectangle, trapezoid, parallelogram, rhombus, ellipse, or the like. The common load-bearing power platform-frame can have a different shape, for example, X (see FIG. 3), H or square-shaped and consists of beam beams (4) of the frame structure. The defragmented (small-sized) PMGs (8,9) can be installed not only in front and rear of the aircraft, but also on the sides of the aircraft. The open bearing spatial frame (6) is a system (spatial truss) of interconnected tubes (14) made of high-strength materials/metals, for example, aluminum alloy and performs the function of a screen (6), completely covering small-sized electric motors and main rotors (10) from their external sides (surfaces, parts).

The open bearing spatial tubular frame-screen (6) can have various sizes and shapes, for example, the shape of ellipsoid or parallelepiped, both as a closed (see FIG. 3) type and an open type. The number of tubes (11, 15) and small-sized (defragmented) independently operating electric motors with main rotors (10) in each PMGs (8,9), inside the screens (6), can be any and the same in front and rear of the aircraft, as well as on the left and right of the aircraft. The tubes (11, 15) can have different shapes and sizes, the tubes (11, 15) can have different connections between themselves and with the beams (4) of the bearing power platform-frame, the interconnected tubes (11,14) can form different shapes. Each front, rear and side small-sized main rotor (10) is installed in such a way that it has its own vertical axis of rotation. Each side small-sized main rotor (10) can be installed in such a way that it has its own horizontal axis of rotation.

Figure 4:
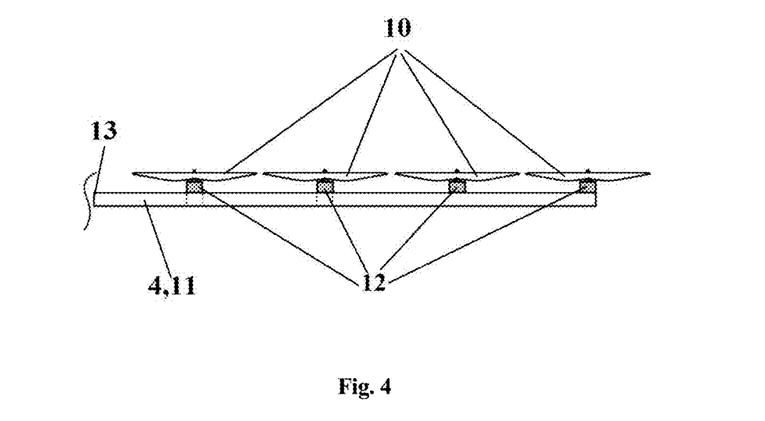
FIG. 4 shows embodiment of the PMG on the frame.

FIG. 3 shows an embodiment of the aircraft in the form of the flying motorcycle with the pilot's seat (5). Also, the aircraft can be unpiloted, or have a cockpit for the pilot and/or passengers. FIG. 4 shows an embodiment of the defragmented PMG, which includes 4 small-sized, obtained by defragmentation of the usual large-sized PMG, independently operating electric motors (12) and main rotors (10). Each small-sized main rotor (10) is connected to the individual independently operating electric motor (12), forming the propeller-motor group (PMG).

In one embodiment, small-sized independently operating electric motors (12) of the main rotors (10) can be fixed with their fixed base on the beam (4) of the common load-bearing power platform-frame, at the certain distance from each other.

In another embodiment, small-sized independently operating electric motors (12) of the main rotors (10) can be fixed with their base on the tube (11), at a certain distance from each other. At the same time, the open end (13) of the tube (11) can be fixed by means of connection (7) to the end section of the beam (4) of the common bearing power platform (frame). The number of tubes (11) with PMG can be any, in different combinations, with different shapes and different sizes.

Figure 5:
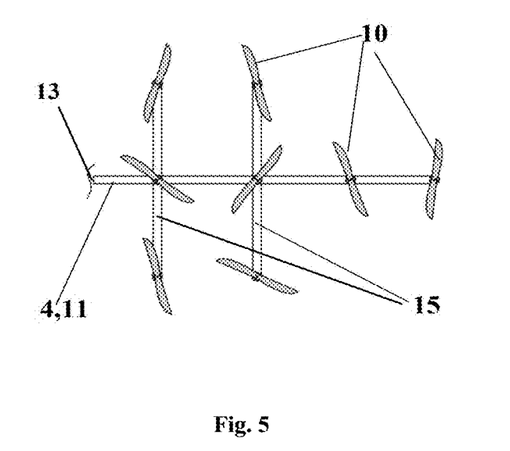
FIG. 5 shows an exemplary embodiment of the PMG on the frame.

FIG. 5 shows an exemplary embodiment of the defragmented PMG (8, 9), consisting of 8 small-sized independently operating electric motors with main rotors (10). In one embodiment, the elongated tube (11) with four small-sized independently operating electric motors with main rotors (10) can be fixed with its one (open) end (13) by means of connecting means (7) at the end section of the beam (4) of the common bearing power platform (frame), while additionally two more tubes (15) of shorter length can be fixed on the elongated tube (11) and across (perpendicular) to it, at the end sections of which one is also fixed the small-sized independently operating electric motor with the main rotor (10).

In another embodiment, four small-sized electric motors of the main rotors (10), obtained by defragmentation of the usual large-sized PMG, can be fixed to the beam—balk (4) of the common bearing power platform-frame, while on the beam (4) and across (perpendicular) to the beam (4), two additional parallel tubes (15) with 2 small-sized independently operating electric motors of the main rotors (10) at their end sections can be fixed.

There are also other embodiments of the aircraft with other PMG configurations, with different connection of the tubes (11,15) to the beams (4) of the common bearing power platform (frame) and against each other. The number, shape, dimensions, connection of beams (4) and tubes (11,15) with PMG can be different, the number of small-sized electric motors with main rotors (10) can also be different and the same in each PMG (8,9).

Figure 6:
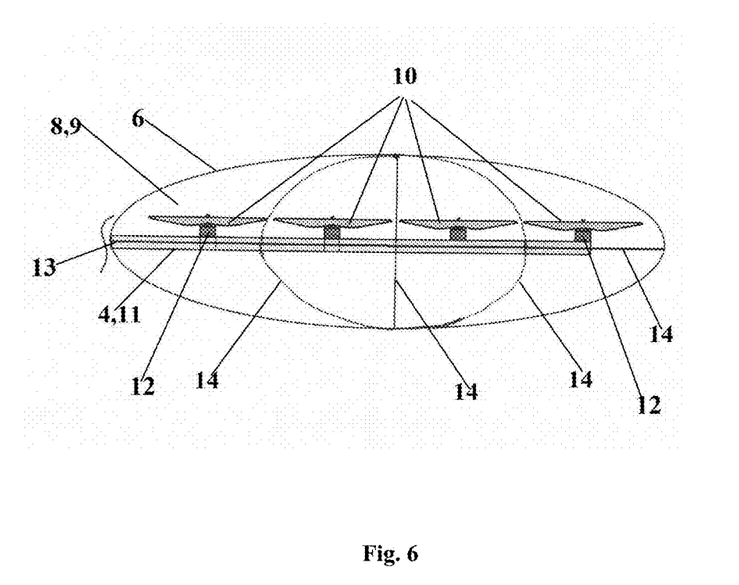
FIG. 6 shows an exemplary embodiment of the PMG inside the ellipsoid-shaped, closed-type screen (side view).

FIG. 6 shows a side view of an exemplary embodiment of the defragmented PMG (8,9) according to FIG. 4 inside the ellipsoid-shaped, closed-type screen. The PMG consists of four small-sized, obtained by defragmentation of the usual large-sized PMG, independently operating electric motors (12) and main rotors (10), while each small-sized main rotor (10) has its own individual small-sized independently operating electric motor (12).

In one embodiment, small-sized independently operating electric motors (12) of the main rotors (10) can be fixed with their fixed base on the beam—balk (4) of the common load-bearing power platform-frame, at the certain distance from each other.

In another embodiment, small-sized independently operating electric motors (12) of the main rotors (10) can be fixed with their fixed base on the tube (11) of the frame, at a certain distance from each other. At the same time, the tube (11) is fixed with its one (open) end (13) by means of a connection (7) on the end section of the beam (4) of the common bearing power platform (frame).

The number of tubes (11) with a PMG can be any, in different combinations, with different shapes, and the interconnected tubes (11) can form any shape, for example, the shape of a petal, as shown in FIG. 3. As the means of connection (7), any means connecting the tubes (10) can be used, for example, the nodal connector. The tubes (11) can be connected to each other and to the beams (4) of the common load-bearing power platform-frame, for example, by welding, glue, riveting and other connection.

The defragmented (small-sized) PMG (8,9) are installed inside the screen (6), made in the form of the open bearing spatial frame of ellipsoid shape, closed type. The exemplary frame (6) is a system (spatial truss) of interconnected tubes (14) made of materials/metals of high strength, for example, aluminum alloy and performs the function of the screen (6), completely covering small-sized independently operating electric motors (12) and supporting screws (10) from the external sides (surfaces, parts). The PMG is installed inside the screen (6) in such a way that small-sized independently operating electric motors (12) with main rotors (10) are visible from all external sides and there is access to them.

Figure 7:
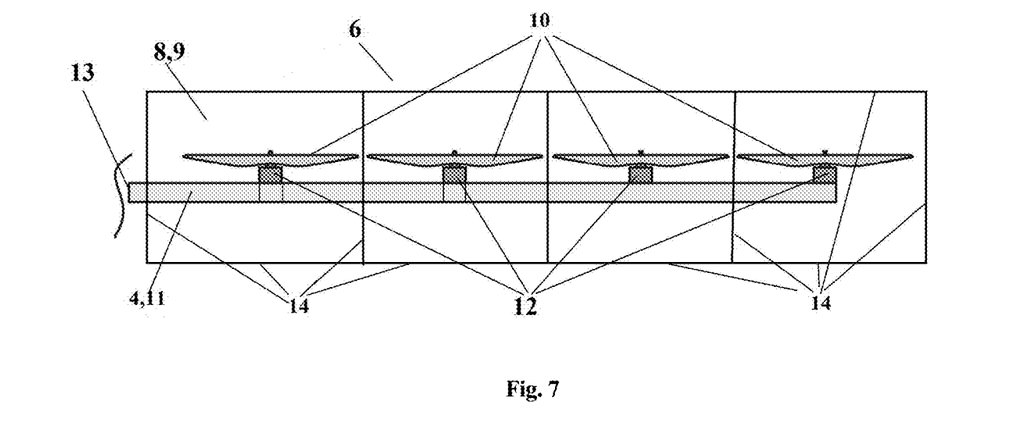
FIG. 7 shows an exemplary embodiment of the PMG inside the rectangular, closed-type screen (side view).

Small-sized PMGs (8,9) can be placed inside screens of various shapes and types (6), for example, in the form of open bearing spatial tubular frames of rectangular (quadrangular) shape made of interconnected tubes (14) (as shown in FIG. 7, side view), as well as inside screens (6) in the form of various housings or rings. Small-sized PMGs (8,9) can be located on different sides of the aircraft, for example, only in front and rear, or in front, rear and sides of the aircraft.

The small-sized PMGs (8,9) can be installed inside the screens (6) in such a way that they are visible from all external sides or only from certain external sides, for example, only from above and/or below. This enables one to quickly identify various malfunctions (breakages) of the PMG (8,9), and carry out the necessary diagnostics and replacement, significantly reducing the time for aircraft maintenance and repair.

Figure 8:
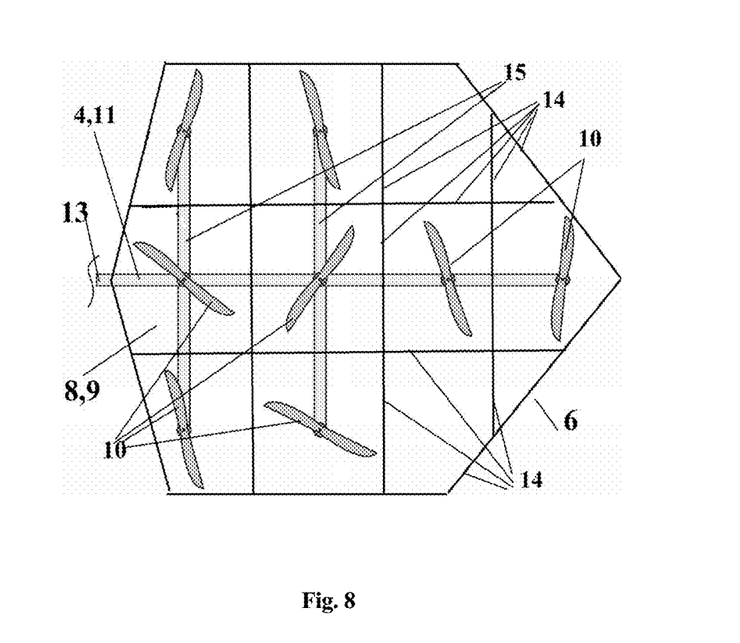
FIG. 8 shows an exemplary embodiment of the PMG inside the screen in the form of hexagon, closed type (top view).

FIG. 8 shows a top view of an exemplary embodiment of the defragmented PMG (8,9) according to FIG. 5 inside the screen in the form of a hexagon, closed type. The small-sized PMG (8,9), obtained by defragmentation of the usual large-sized PMG, consists of 8 small-sized independently operating electric motors with main rotors (10). Each main rotor (10) is connected to its individual independently operating electric motor.

In one embodiment, four independently operating electric motors with main rotors (10) can be fixed at a certain distance from each other on the elongated tube (11), fixed with its open end (13) by means of connecting means (7), for example, the nodal connector, on the end sections of the beams (4) of the common bearing power platform-frame. Additionally, on the elongated tube (11) and across (perpendicular) two tubes (15) of shorter length are fixed to it, at the end sections of which one small-sized independently operating electric motor with the main rotor (10) is fixed.

In another embodiment, four small-sized independently operating electric motors of the main rotors (10) are fixed at the certain distance from each other on the beam (4) of the common bearing power platform-frame, while additionally two tubes (15) parallel to each other are fixed across (perpendicular) to the beam (4) of the common bearing power platform-frame and on the beam (4) by means of connecting means. At the end sections of the two tubes (15), one small-sized independently operating electric motor with the main rotor (10) is placed.

The small-sized PMGs (8,9) are installed inside the screen (6) in the form of the open bearing spatial (tubular) frame-system (spatial truss) of interconnected tubes (14) made of materials/metals of high strength, for example, aluminum alloy. The screen (6) completely covers electric motors and main rotors (10) from their external sides (surfaces, parts) and has the shape of hexagon, closed type.

Figure 9:
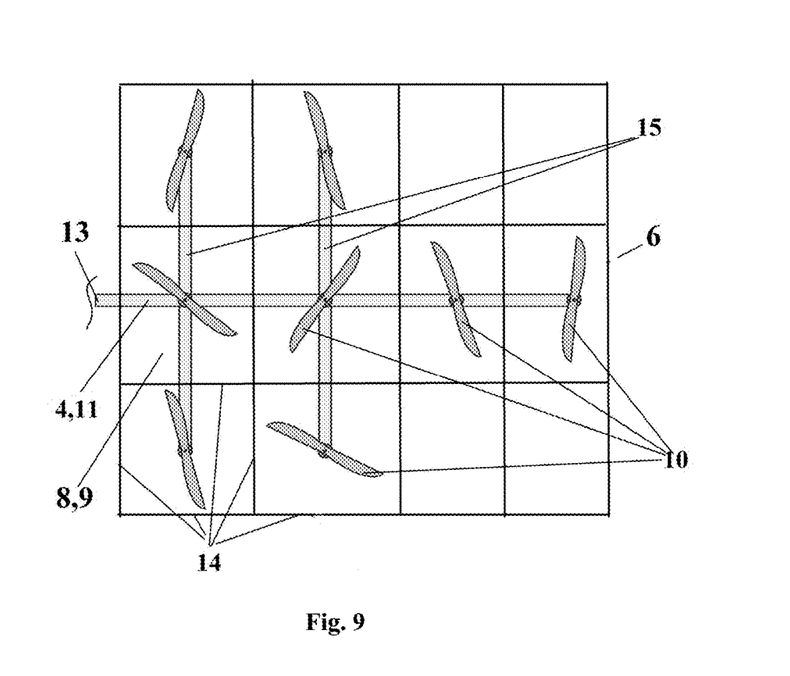
FIG. 9 shows an exemplary embodiment of the PMG inside the screen in the form of quadrilateral, closed type (top view).

The small-sized PMGs (8,9) are installed inside the screen (6) in such a way that electric motors with main rotors (10) are visible from all external sides and there is access to them. The small-sized PMGs (8,9) can also be placed inside screens of various shapes and types, for example, in the form of open bearing spatial tubular frames of rectangular (quadrangular) shape (as shown in FIG. 9). The shielded small-sized PMGs (8,9) can be located on different sides of the aircraft, for example, only in front and rear or in front, rear and sides of the aircraft.

The number of tubes (11,15) fixed to the beam (4) of the platform (frame) can be any. Tubes (11,15) can have different shapes, sizes and lengths. The number of independently operating small-sized electric motors with main rotors (10) on tubes (11,15) and beams (4) can be any.

Figure 10:
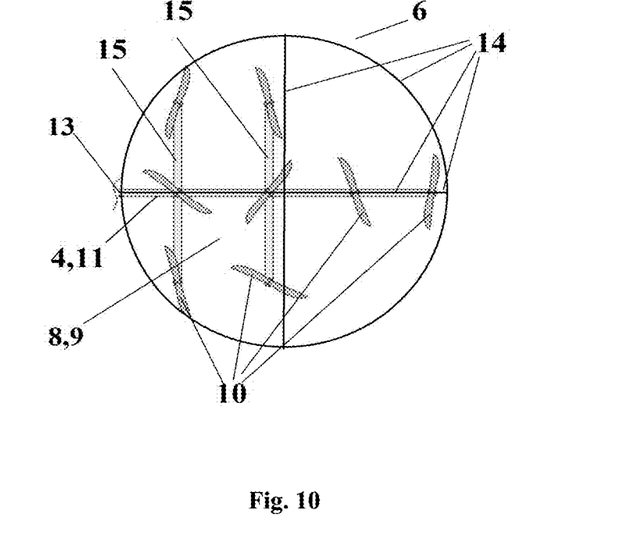
FIG. 10 shows an exemplary embodiment of the PMG inside the screen in the form of circle (sphere), closed type (top view).

Interconnected tubes (11,15) or tubes (11,15) with beams (4) of the common load-bearing power platform (frame) with small independently operating electric motors of the main rotors (10) can form different shapes around the perimeter (area), for example, the shape of polygon, trapezoid, rectangle, triangle, circle (as shown in FIG. 10), ellipsoid, etc.

The tubes (11, 15) can be connected to the beams (4) of the common load-bearing power platform and to each other, for example, by welding, glue, riveting and other type of connection.

The screen (6) can have various shapes and sizes, for example, the rectangular (square) shape (as shown in FIG. 9), spherical or circular shape (as shown in FIG. 10), as well as other forms, both closed and open type. Various housings or rings can also be used as screens.

Other variants of aircraft implementation with other configurations of defragmented (small-sized) are also possible PMGs (8,9), with different connection of tubes (11,15) to the beams (4) of the common bearing power platform (frame) and against each other. The number, shape, dimensions, connection of beams (4) and tubes (11,15) with PMG (8,9) can be different, the number of small-sized electric motors (12) with main rotors (10) can also be different and the same in each front and rear PMG (8,9), as well as in the side PMG.

The increasing of the safety of vertical take-off/landing and aircraft flight and the ensuring the protection of propellers (10) from collisions with the ground surface and other obstacles are achieved due to the absence of open rotating rotor blades (10) of large sizes, the main rotors (10) are installed and fixed inside screens (6), for example, inside open bearing spatial tubular frames or housings or rings that perform the protective function, limiting access to the rotors (10). The use of shielding the ends of the main rotors blades (10) also makes it possible to reduce the noise level of the PMG (8,9).

The increase of fail-safety while maintaining the position of the aircraft in flight and, consequently, the safety of the aircraft flight is achieved due to the defragmentation of the PMG (8,9)—the use of independently operating PMGs (8,9) of the smaller size, with the small diameter of the propellers (there are more of them), as well as due to the shielding of the PMG (8,9). The use of independently operating electric motors (12) for each individual main rotor (10) of each PMG (8,9) and the use of independently operating PMG (8,9) makes it possible to significantly increase the fail-safety of PMG (8,9), which leads to the increase in the safety of the aircraft flight.

The small-sized PMGs (8,9) (electric motors (12) and main rotors (10)) can be installed inside screens (6) in such a way that it is visible from all external sides to them there is access or in such a way that they are visible only from certain external sides, for example, only from above and below. This allows one to quickly identify and eliminate various malfunctions (breakages) of electric motors (12) and main rotors (10), repair and replace them, thereby increasing the maintainability of the aircraft.

The increase in the compactness and mobility of the aircraft is achieved by defragmentation of the PMG—the breakdown of PMG of large sizes (diameters) into smaller PMG (8,9), their assembly and installation in smaller groups, i.e. instead of installing one separate large-diameter main rotor (1,2), several small-sized smaller-diameter main rotors (10) can be installed, instead of the large motor (3), small-sized electric motors (12) can be installed, which also leads to increase in the stability of the aircraft, increased maneuverability, controllability and flight speed of the aircraft, significant increase of the responsiveness of the PMG (8,9) from 1.5 sec. up to 0.1 seconds, increasing the fail-safety, safety, stability and comfort of the aircraft flight.

As a result of PMG defragmentation, the weight decreases (due to which it becomes possible to increase the battery), the response (responsiveness) increases PMG from 1.5 s to 0.1 s, traumatic propellers (2,3) of large diameter are eliminated.

The distributed thrust of the PMG (8,9) over the area of interconnected tubes (11,14,15) increases the stability of the aircraft, it becomes possible to give any geometric shape to the PMG (8,9), unlike only circle, which has the beneficial effect on the stability, rigidity, efficiency and external attractiveness of the entire aircraft. There is also the possibility of changing the weight distribution, the aircraft with defragmented PMG (8,9) has the lower cost, high maintainability.

The defragmentation of the PMG makes it possible to obtain more compact dimensions of the PMG (8,9) in terms of the blowing area, it becomes possible to install, for example, the parachute. Transferring part of the power electronics to the tubes (11,14,15) and beams (4) frees up additional useful space in/on the aircraft body, it becomes possible to use compact chargers. The PMG defragmentation also ensures the modularity and versatility of the PMG (8,9) for use in different types of aircraft, there is the possibility of modernization of the aircraft.

By adjusting the rotation speed of the small-sized rotors (10) individually or all together at the same time, using small-sized independently operating electric motors (12), the aircraft can perform various actions (maneuvers) during flight, for example, turning, hovering, and also achieve the certain balance to ensure stability and comfort of flight.

As a result of the defragmentation of the propeller-motor group (PMG), the transition is carried out from conventional main rotors with the diameter of 140 cm to the group, for example, of 50 smaller PMGs with the diameters of the main rotors of 12.7 cm mounted on tubes (11,14,15), which in turn are mounted, for example, on the regular places of the conventional PMG of the aircraft bearing frame.

The aircraft can be made unpiloted, or have the pilot's cabin or the cockpit for the pilot and passengers.

The aircraft can be used both for the transportation of passengers and for the transportation and/or delivery of various cargo to out-of-the-way areas and places.

The claimed aircraft for the implementation of the claimed method is compact, safe during take-off/landing and flight, is made with the possibility of both horizontal straight flight and vertical take-off/landing, has high maneuverability, stability and controllability, as well as increased flight speed.

At the moment, an exemplary prototype aircraft with defragmented PMG (8,9) has been manufactured and tests of the aircraft have been carried out, as a result of which the following exemplary preliminary data (parameters) and exemplary characteristics have been obtained (see Tables 1 and 2).

TABLE 1

Experimental data

| Parameters | Comparative Aircraft - analog with conventional front and rear main rotors (see FIG. 1) | Inventive aircraft with defragmented PMGs |
|---|---|---|
| Thrust from the disk area (kg/sq.m.) | 74 | 140 |
| PMG weight from area (kg/sq.m.) | 5.4 | 2.1 |
| Consumed power from area (kW/sq.m.) | 18.5 | 50.9 |

TABLE 2

Characteristics of inventive aircraftsdfsd

| Flight time (hovering) | 12 minutes |
| Flight time (top speed) | 6 minutes |
| Hovering thrust with pilot | 65% |
| Maximum thrust | 340 kg |
| Pilot's weight in equipment | up to 100 kg |

Despite the fact that the claimed group of inventions is shown and described with reference to its specific embodiments, specialists in this field of technology will understand that various changes in the form and content of the claimed group of inventions can be made in it without deviation from the essence and scope of the group of inventions, which are defined by the attached claims, taking into account the description and drawings.

The invention claimed is:

1. An aircraft for vertical take-off, landing and horizontal straight flight, the aircraft comprising:
   a common load-bearing frame including a plurality of supporting beams, the supporting beams including a pair of supporting beams with distal ends at a front of the aircraft and a pair of supporting beams with distal ends at a rear of the aircraft;
   wherein each of the distal ends is coupled to a nodal connector;
   wherein each of the nodal connectors is coupled to a plurality of tubes extending outwardly in multiple directions from the nodal connector; and
   wherein two or more of the tubes include a plurality of independently operating electric motors and a plurality of lifting propellers mounted thereon, each of the electric motors being associated with and connected to a respective one of the lifting propellers and located at a distance from each other to form independently operating propeller motor groups that are distanced from each other.

2. The aircraft of claim 1, wherein the propeller motor groups are oriented such that a perimeter of the propeller motor groups is in a shape one of: a circle, a triangle, a square, a rectangle, a polygon, a trapezoid, a parallelogram, a rhombus, and an ellipse.

3. The aircraft of claim 1, wherein each of the independently operating propeller motor groups is installed inside a protective screen.

4. The aircraft of claim 3, wherein open spatial tubular frames, housings, or rings are used as screens.

5. The aircraft of claim 4, wherein the independently operating propeller motor groups are installed at a front and at a rear of the aircraft inside the screens in such a way that they are visible from all external sides and there is access to them.

6. The aircraft of claim 5, wherein a number of the independently operating propeller motor groups at the front of the aircraft is equal to a number of the independently operating propeller motor groups at the rear of the aircraft.

7. The aircraft of claim 1, wherein the aircraft is one of unpiloted or piloted.

8. A method of vertical take-off, landing and horizontal straight flight of an aircraft, the method comprising:
   providing the aircraft with a common load-bearing frame including a plurality of supporting beams, the supporting beams including a pair of supporting beams with distal ends at a front of the aircraft and a pair of supporting beams with distal ends at a rear of the aircraft;
   wherein each of the distal ends is coupled to a nodal connector;
   wherein each of the nodal connectors is coupled to a plurality of tubes extending outwardly in multiple directions from the nodal connector; and
   wherein two or more of the tubes include a plurality of independently operating electric motors and a plurality of lifting propellers mounted thereon, each of the electric motors being associated with and connected to a respective one of the lifting propellers and located at a distance from each other to form independently operating propeller motor groups that are distanced from each other.

9. The method of claim 8, wherein the propeller motor groups are oriented such that a perimeter of the propeller motor groups is in a shape of one of: a circle, a triangle, a square, a rectangle, a polygon, a trapezoid, a parallelogram, a rhombus, and an ellipse.

10. The method of claim 8, wherein each of the independently operating propeller motor groups is installed inside a protective screen.

11. The method of claim 10, wherein open spatial tubular frames, housings, or rings are used as screens.

12. The method of claim 11, wherein the independently operating propeller motor groups are installed at a front and at a rear of the aircraft inside the screens in such a way that they are visible from all external sides and there is access to them.

13. The method of claim 12, wherein a number of the independently operating propeller motor groups at the front of the aircraft is equal to a number of the independently operating propeller motor groups at the rear of the aircraft.

14. The method of claimer 8, wherein the aircraft is one of unpiloted or piloted.

\* \* \* \* \*